Figure 1:
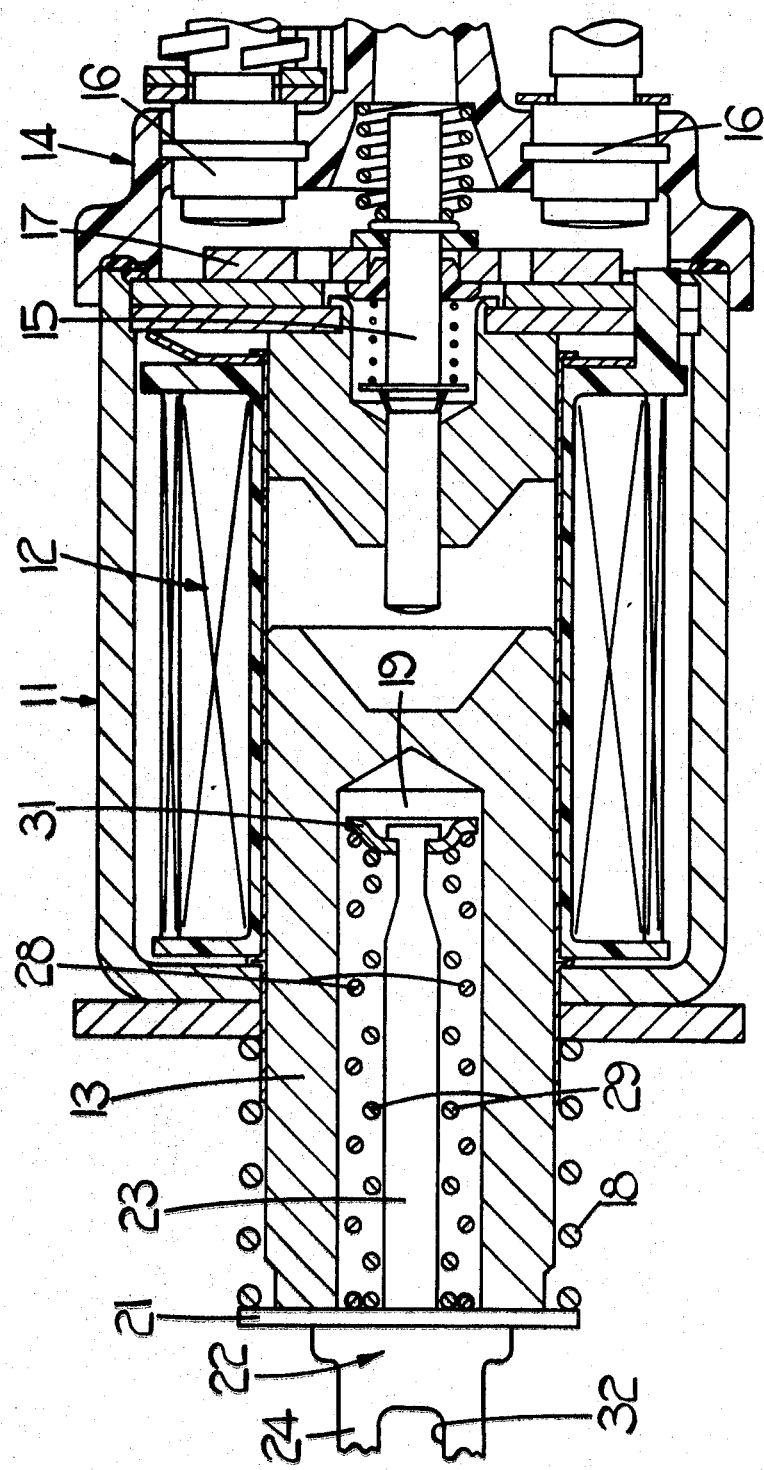

United States Patent [19]
Lazenby

[11] 3,750,066
[45] July 31, 1973

[54] SOLENOID FOR USE IN AN ENGINE STARTING MECHANISM

[75] Inventor: Allan William Lazenby, Shirley, Solihull, England

[73] Assignee: Joseph Lucas (Industries) Limited, Birmingham, England

[22] Filed: Dec. 3, 1971

[21] Appl. No.: 204,606

[30] Foreign Application Priority Data
Dec. 8, 1970   Great Britain.................. 58,161/70

[52] U.S. Cl............................... 335/274, 335/279
[51] Int. Cl............................................ H01f 7/13
[58] Field of Search.................. 335/255, 259, 264, 335/279, 274

[56] References Cited
UNITED STATES PATENTS

| | | | |
|---|---|---|---|
| 1,817,592 | 8/1931 | Sokoloff............................ | 335/259 |
| 3,473,780 | 10/1969 | Harms............................. | 335/259 X |
| 3,509,505 | 4/1970 | Zagrzjewski.................... | 335/279 X |
| 3,509,506 | 4/1970 | Bird................................ | 335/279 X |

*Primary Examiner*—George Harris
*Attorney*—Holman & Stern

[57] ABSTRACT

Armature assembly for a solenoid for use in an engine starting mechanism the armature assembly being of the kind comprising a hollow armature a link member including a first part housed within the armature and a second part which protrudes from the armature and a resilient longitudinally compressible element within the armature and acting on the link member to resiliently resist withdrawal of the link member from the armature. The method includes the steps of slidably engaging a first abutment member with said first part of the link member the link member having an abutment intermediate its ends which limits relative sliding movement between the link member and the first abutment member in one direction. A pair of compression springs are then engaged with the link member and abut at one end against the first abutment member the springs are then compressed so that the end of the link member protrudes from the end of the springs remote from the first abutment member and a second abutment member is then engaged with the projecting portion of the link member to retain the springs in a compressed condition acting between the two abutment members. The first part of the link member carrying the springs is then inserted into the hollow armature and the first abutment member is secured to the armature.

4 Claims, 6 Drawing Figures

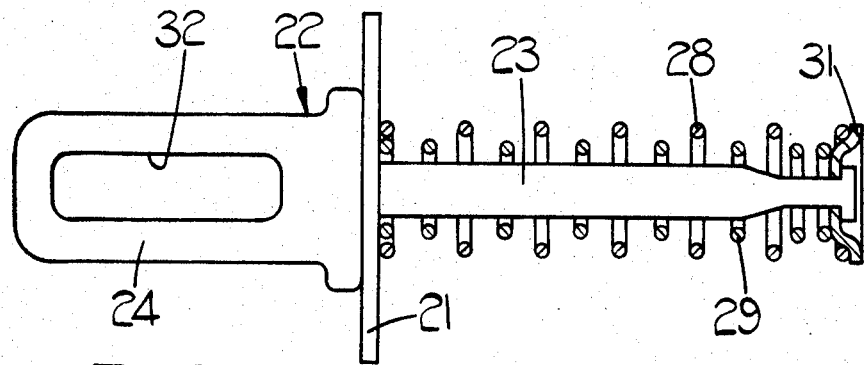
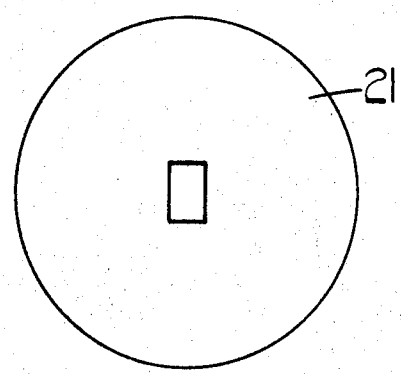
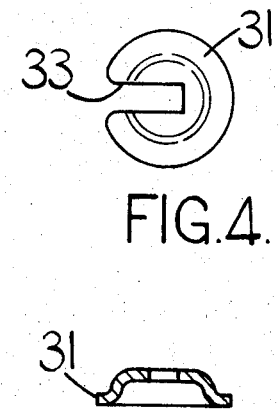
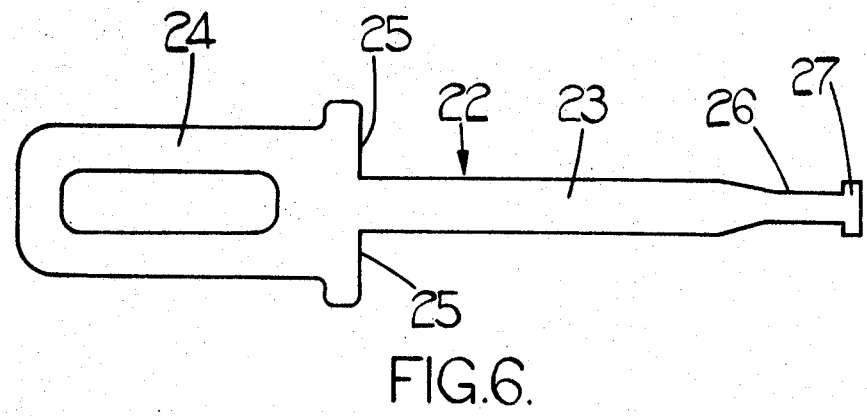

SOLENOID FOR USE IN AN ENGINE STARTING MECHANISM

This invention relates to a method of manufacturing an armature assembly for a solenoid for use in an engine starting mechanism, the solenoid being of the kind including a body and an armature assembly comprising, a hollow armature slidable within the body, a link member including a first part housed within the armature and a second part which protrudes from the armature, and a resilient longitudinally compressible element within the armature and encircling said first part of the link member, one longitudinal end of said element acting against the armature while the other longitudinal end of the element acts against the link member so that said element resiliently resists withdrawal of the link member from the armature, such movement of the link member relative to the armature tending to compress said element.

According to the invention a method of manufacturing an armature assembly for a solenoid of the kind specified includes the steps of slidably engaging a first abutment member with the first part of the link member, the link member having an abutment intermediate its ends which limits relative sliding movement between the link member and the first abutment member in one direction, engaging said resilient, longitudinally compressible element with said first part of the link member so that said element encircles said first part of the link member, compressing said element in a longitudinal direction so that one end of the element engages said first abutment member, said first abutment member engages said abutment and the free end of said first part of the link member protrudes from the other end of said element, engaging a second abutment member with the portion of said first part of the link member which protrudes from said other end of said element between said other end of the element and a head at the free end of the first part of the link member, releasing said element so that the element urges said second abutment member into engagement with said head, inserting the first part of the link member into the hollow armature and securing the first abutment member to the armature.

Preferably the link member is formed from strip material.

Desirably said head is constituted by a region of the link member at one side of a region of reduced cross-section. Conveniently the second abutment member is in the form of a disc having a generally radially disposed slot therein, the width of the slot being not less than the width of the reduced region of the link member so that the disc can be engaged with the reduced region, the slot being too narrow to permit the head to pass therethrough.

The invention further resides in an armature assembly for a solenoid, the assembly including a hollow armature, a link member extending into the armature, a first abutment member secured to the armature and slidably engaged with teh link member, a resilient longitudinally compressible element surrounding said link member within the armature, said element abutting at one end against the first abutment member, and a second abutment member releasably engaged with the end of the link member within the armature, the other end of said element abutting against the second abutment member.

One example of the invention is illustrated in the accompanying drawings wherein:

FIG. 1 is a sectional view of a solenoid for use in an engine starting mechanism, FIG. 2 is a side elevational view, partly in section, of part of the armature assembly of the solenoid shown in FIG. 1, FIG. 3 is a plan view of a component of the armature assembly, FIG. 4 is a plan view of a second component of the armature assembly, FIG. 5 is a sectional view of the component shown in FIG. 4, and FIG. 6 is a plan view of a third component iof the armature assembly.

Referring to the drawings, the solenoid includes a multi-part body 11 carrying the pull-in and hold-in windings 12 of the solenoid. An armature assembly including a plunger 13 is axially slidable within the body 11, and the body 11 also carries a switching mechanism generally indicated at 14. The switching mechanism includes a spindle 15 which is movable by the plunger 13 to cause bridging of a pair of contacts 16 by a movable contact piece 17. In use, the contacts 16 are electrically connected in the energising circuit of a starter motor with which the solenoid is associated.

The armature assembly of the solenoid includes a hollow steel plunger 13 which is mounted for sliding movement in the body 11, the plunger 13 being drawn into the body 11 against the action of a return spring 18 when the pull-in winding of the solenoid is energised. Full inward movement of the plunger 13 causes the end of the plunger 13 to engage the spindle 15 thereby moving the spindle 15 to cause bridging of the contacts 16. When the circuit of both windings of the solenoid is broken, then the plunger is moved outwardly from the body 11 by the spring 18, and the spindle 15 and bridging piece 17 are moved in a direction away from the contacts 16 by a return spring within the switch assembly 14. The plunger 13 has a central bore 19, the inner end of which is closed, and the outer end of which is partially closed by an abutment disc 21. The disc 21 is rigidly secured to the end of the plunger 13, and the return spring 18 abuts at one end against the disc 21, and at its other end against the casing of the solenoid. Extending through the disc 21, and slidable relative thereto is a link member 22. The link member 22 is formed from a strip of steel, and includes a first, narrow portion 23 positioned in use within the bore 19, and a second, wider portion 24. At the junction of the portion 22, with the portion 24 is defined a pair of shoulders 25 which abut against the outer surface of the disc 21, and limit the movement of the link member 22, in one direction, relative to the plunger 13.

At its free end, the portion 23 of the link member 22 is provided with a neck 26 of reduced width, the neck 26 defining at the free end of the portion 23 a head 27. The head 27 is of the same dimensions as the remainder of the portion 23.

Positioned within the bore 19, and encircling the portion 23 of the member 22 is a longitudinally compressible, resilient, element in the form of a pair of helically wound compression springs 28, 29, the springs 28, 29 being positioned one within the other. The springs 28, 29 abut at one end against the inner surface of the disc 21, and abut at their other ends against a stop member 31 mounted on the free end of the portion 23 of the link member 22. The springs 28, 29 urge the link member 22 to slide relative to the plunger 13 to a position wherein the shoulders 25 of the link member abut against the outer surface of the disc 21. Movement of the link member 22 in a direction to withdraw the portion 23 thereof from the plunger 13 causes further compression of the springs 28, 29, the springs 28, 29 being initially pre-stressed when the armature assembly is assembled.

The portion 24 of the link member 22 is formed with a longitudinally extending slot 32 within which one end of a lever is engaged in use. The other end of the lever is coupled to the longitudinally movable pinion of the starter motor, and the lever is pivoted on the body of the starter motor intermediate its ends. An abutment (not shown) is slidably mounted in the slot 32, and is urged towards the end of the slot 32 remote from the disc 21 by means of a spring (not shown). Said one end of the pinion operating lever is engaged between the slidable abutment and the end of the slot 32 remote from the disc 21, said spring preventing free play between said one end of the lever and the link member.

The pinion of the starter motor is of course rotatable with the rotor shaft of the starter motor, and the arrangement is such that energisation of the pull-in winding of the solenoid causes movement of the pinion of the starter motor into engagement with the toothed wheel of the engine to be started. As the pull-in winding of the solenoid is energised the plunger 13 is withdrawn into the body, thereby pivoting said lever, and moving said pinion longitudinally relative to the rotor shaft of the starter motor. In the event that the pinion fully engages the toothed wheel of the engine, then the plunger 13 moves freely to a position wherein the spindle 15 is moved to cause closure of the contacts 16, thereby energising the starter motor so that the starter motor cranks the engine. However, in the event that the pinion does not achieve full engagement with the toothed wheel, then the link member 22 will be arrested, since the pinion cannot fully engage the toothed wheel. However, the pull-in winding of the solneoid still remains energised, and the plunger 13 is withdrawn into the body of the solenoid and moves relative to the link member 22, further compressing the springs 28, 29. When the plunger 13 abuts against the spindle 15, and causes the bridging contact 17 to bridge the contacts 16, then the starter motor is energised, and the pinion is rotated relative to the toothed wheel of the engine. Thus, the pinion during rotation reaches a position wherein it is capable of fully engaging the toothed wheel of the engine, and is no longer impeded. When this situation occurs, the springs 28, 29 rapidly restore the link member 22 to the position wherein the shoulders 25 engage the disc 21, thereby moving the pinion without further movement of the plunger 13.

The armature assembly is manufactured in the following manner. The portion 23 of the link member 22 is inserted through the disc 21 until the shoulders 25 abut against the disc 21. The portion 23 is then inserted into the springs 28, 29, which in their unstressed condition are longer than the portion 23. A compressing device is then used to compress the springs 28, 29 relative to the link member 22, thereby forcing the disc 21 against the shoulders 25. When the springs 28, 29 have been sufficiently compressed to cause the neck 26 and the head 27 of the portion 23 to protrude beyond the ends of the springs 28, 29 the stop member 21 is engaged with the neck 26. The stop member is in the form of a dished disc of steel, having a peripheral flange extending at 90° to the axis of the disc, and a radially extending slot 33 which extends from the edge of the disc, beyond the centre of the disc. The width of the slot 33 is equal to or greater than the width of the neck 26, but is less then the width of the head 27. The stop member 31 is engaged with the neck by inserting into the slot 33, the member 31 presenting its generally convex surface towards the disc 21. The device compressing the springs 28, 29 is then removed, and the springs restore to a position where they engage the stop member 31, and urge the stop member 31 against the head 27 of the portion 23. The outer springs 28 engages the peripheral flange of the member 31, the disc portion of the member 31 extending within the spring 28 and engaging the head of the spring 29. Thus the springs 28, 29 are held in a prestressed condition between the stop member 31 and the abutment disc 21. It will be appreciated, that the disc could be provided with a closed ended slot centrally disposed on the disc, and of length equal to the width of the head 27. In such an arrangement, the stop member would be engaged with the portion 23 by once again compressing the springs, and then inserting the head 27 through the slot in the stop member, the stop member then being rotated through 90° to displace the slot therein from the head 27.

It wil be appreciated, that in either suggested arrangement no machining, or deforming operation need be performed on the end of the portion 23 to retain the stop member 31 in position once the stop member 31 has been engaged with the portion 23. The portion 23 together with the springs 28, 29 and the stop member 31 are then inserted into the bore 19 of the plunger 13, until the disc 21 abuts against the end of the plunger 13. The plunger 13 is then secured to the disc 21 in any convenient manner, for example by riveting or welding.

I claim:

1. An armature assembly for a solenoid, including a hollow armature, a link member extending into the armature, a first abutment member secured to the armature and slidably engaged with the link member, a resilient longitudinally compressible element surrounding said link member within the armature, said element abuting at one end against the first abutment member, and a second abutment member releasably engaged with the end of the link member within the armature, the other end of said element abuting against the second abutment member.

2. An armature assembly as claimed in claim 1 wherein the link member is formed from strip material.

3. An armature assembly as claimed in claim 1 wherein a region of the link member at one side of an area of reduced cross section defines a head on the first mentioned end of said link member.

4. An armature assembly as claimed in claim 3 wherein the second abutment member is in the form of a disc having a generally radially disposed slot therein, the width of the slot being not less than the width of the reduced region of the link member so that the disc can be engaged with the reduced region, the slot being too narrow to permit the head to pass therethrough.

* * * * *